United States Patent

Hamilton

[11] Patent Number: 4,717,081
[45] Date of Patent: Jan. 5, 1988

[54] TREE RESIDUE PROCESSOR

[75] Inventor: Douglas D. Hamilton, Montreal, Canada

[73] Assignee: Canadian Patents and Development Limited, Canada

[21] Appl. No.: 647,794

[22] Filed: Sep. 6, 1984

[30] Foreign Application Priority Data

Sep. 8, 1983 [CA] Canada .................................. 436297

[51] Int. Cl.[4] ........................ B02C 13/30; B02C 18/24
[52] U.S. Cl. .................................. 241/60; 241/101.7; 241/152 A
[58] Field of Search .................. 241/101.7, 60, 152 A, 241/154, 63, 64, 36, 34, 189 R

[56] References Cited

U.S. PATENT DOCUMENTS

| | | | |
|---|---|---|---|
| 1,126,416 | 1/1915 | Dierdorff | 241/152 A X |
| 1,181,967 | 5/1916 | Curtis et al. | 241/152 A X |
| 4,168,035 | 9/1979 | Palm et al. | 241/101.7 X |

FOREIGN PATENT DOCUMENTS

| | | | |
|---|---|---|---|
| 1046473 | 1/1979 | Canada | 241/101.7 |
| 654214 | 3/1979 | U.S.S.R. | 241/101.7 |

*Primary Examiner*—Mark Rosenbaum
*Attorney, Agent, or Firm*—Stanley E. Johnson

[57] ABSTRACT

Apparatus for reducing to a smaller size residue or debris left behind after a tree processing or harvesting operation wherein the debris is dropped into a vertical assembly having a first reduction stage followed by a second reduction stage and below which there is mounted a fan or other conveyor means for delivering the reduced size of particles to a collecting container or other area. Being vertically oriented, there is self feeding from one unit to another and on the initial reduction unit, if desired, other impeller means can be utilized for infeeding the material to the cutters. The apparatus may be permanently mounted at a suitable location or, alternatively be mounted on a self-propelled mobile vehicle, movable from one location or another, and towing a trailer having a chip collecting container mounted thereon.

2 Claims, 5 Drawing Figures

TREE RESIDUE PROCESSOR

FIELD OF THE INVENTION

This invention relates to apparatus for processing residue or debris left behind after a tree processing or harvesting operation. The residue normally consists of branches, tree tops and the like. Collection and processing of logging residues or debris into a more concentrated form can be accomplished using land clearing equipment and mobile chippers. Productivity, however, is relatively low and costs are relatively high and thus commercially uneconomical.

BACKGROUND OF THE INVENTION

There are a number of problems associated with processing tree logging debris and residue, some of which include the size of the material, damage to chipper knives by rocks and other foreign material and a general underutilization of equipment capacity. It has been found that the collection of processing recovery is affected by the size of the debris or residue material; the proportion of original residue recovered in the form of processed material being substantially lower for small diameter material.

There have been a number of proposals for handling logging residue including mobile chippers, stump splitters and the like.

Apparatus is known consisting basically of a mobile residue pickup and processing apparatus where at the front of the vehicle there is located a housing having a driven pickup assembly thereon for picking up residue such as branches, tree tops and the like left on the ground following a tree harvesting operation. The pickup apparatus operates in cooperation with cutting knives to cut up the residue into smaller pieces and means is provided to ensure the smaller cut up pieces do not accumulate and clog the passage through which they move during operation of the machine.

The aforementioned known mobile apparatus picks up the residue and reduces it to smaller pieces, the entire assembly being effectively a horizontal processing unit where the material at the front is picked up and passed horizontally through, and propelled by conveyor means to, a residue collector such as a container.

SUMMARY OF THE INVENTION

One object of the present invention is to provide an apparatus where there is a two-stage reduction of the residue and mounted vertically so there is automatic feeding from one to the other of the units and below which there is located conveyor means for delivering the reduced particles to a collecting area.

One object of the present invention is to provide a vertically oriented apparatus where material is infed to the top and thereafter by gravity passes from a first debris reduction unit to a second reduction unit and onto a conveyor system whereby the cut up residue is propelled to a residue collector. The residue processor may be permanently mounted at a suitable location for processing the residue or alternatively mounted on a self-propelled mobile vehicle or trailer for movement from one location to another.

LIST OF DRAWINGS

The invention is illustrated by way of example with reference to the accompanying drawings wherein.

DESCRIPTION OF PREFERRED EMBODIMENT

Figure 1:
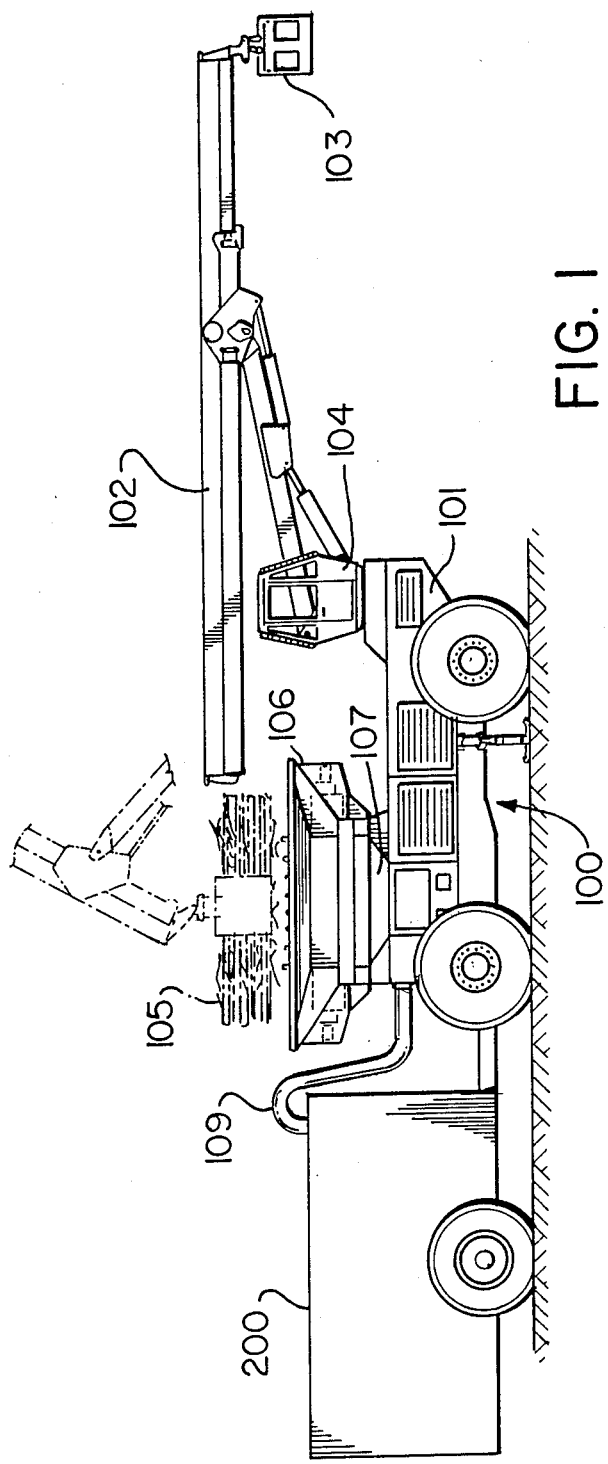
FIG. 1 is a vertical side elevational view of a self-propelled residue processor provided in accordance with one aspect of the present invention.

Referring to the drawings, there is illustrated in FIG. 1 a mobile self-propelled residue processor 100 towing a trailer 200 for collecting the processed residue.

The mobile processor 100 comprises a mobile self-propelled vehicle 101 having an extendible and retractable boom 102 mounted thereon with a grapple 103 at the free outer end thereof. The extendible and retractable boom is attached to an operator's cab unit 104, (the controls for the machine being located in the operator's cab) and which is rotatably mounted to slew about a vertical axis so that the operator is always located at a position appropriately to see what is being handled and grasped by the grapple. In broken line the grapple is illustrated holding a load of debris 105 prior to being dropped into the residue processing portion of the apparatus.

Figure 2:
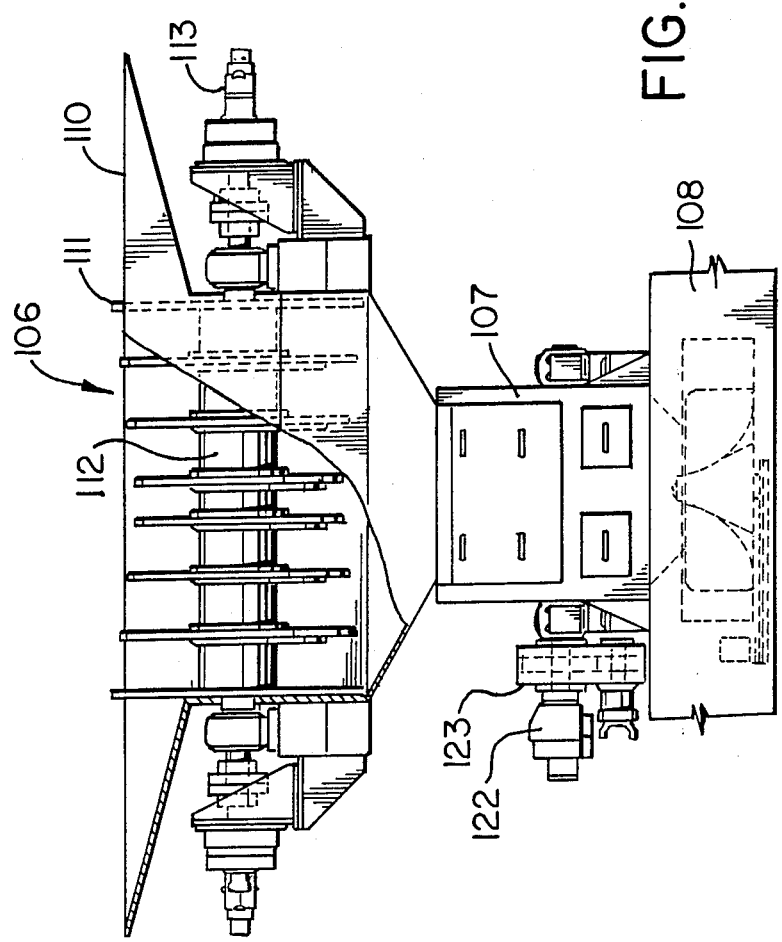
FIG. 2 is a partial sectional right-hand elevational view of the processing assembly on the mobile vehicle illustrated in FIG. 1.
Figure 3:
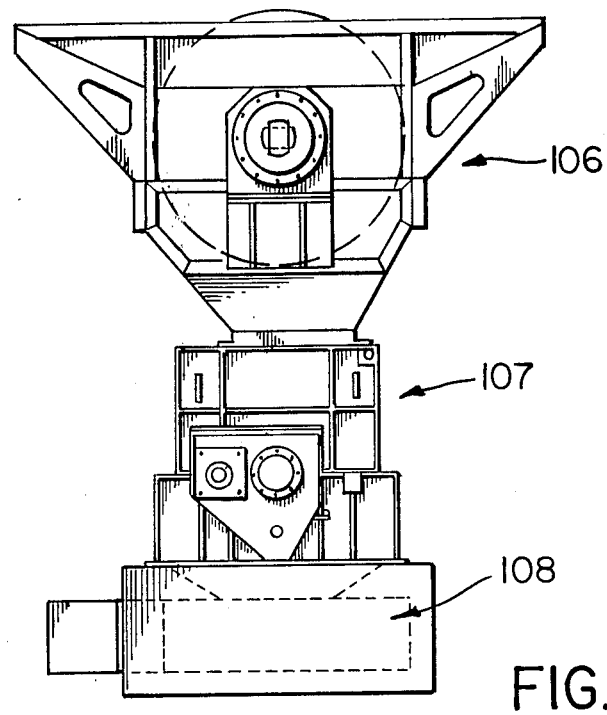
FIG. 3 is a right-hand elevational view of FIG. 2.
Figure 4:
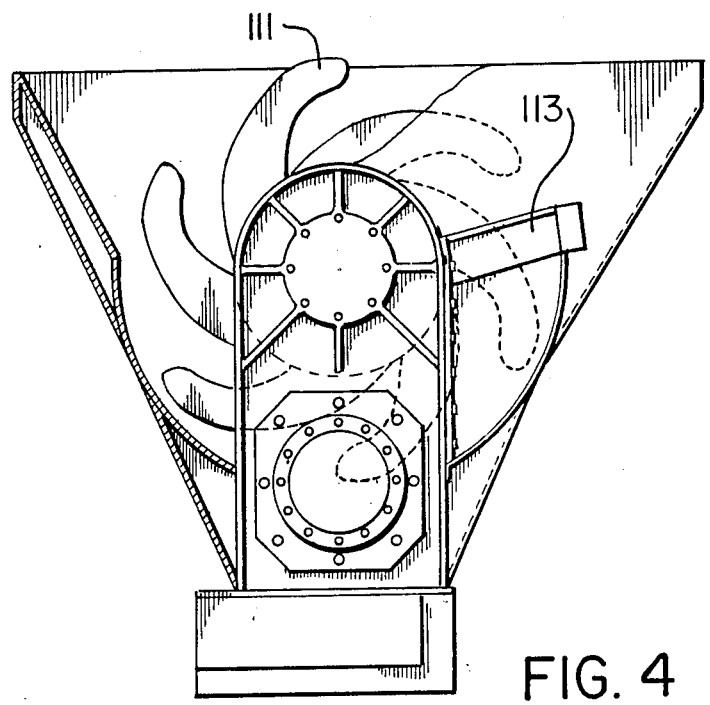
FIG. 4 is a partial sectional vertical elevational view of an upper portion of the debris first stage reducing apparatus illustrated in FIG. 3.

The residue processing apparatus comprises a first residue reduction unit 106 located vertically above a second residue reduction unit 107 and which discharges into a fan blower unit 108 (see FIG. 2) that conveys the mutilated or broken up residue to the container on the trailer 200 by way of a conduit 109.

The first residue reduction unit 106 has a hopper 110 on the upper end thereof for receiving residue to be processed, the residue being dropped thereinto by the grapple 103. The residue is broken up by a plurality of arms 111 mounted on a shaft or hub 112 and rotated by one or more hydraulic motors 113. The arms 111 are spaced apart from one another circumferentially around the shaft or hub 112 and spaced longitudinally therealong and cooperate with fixed cutter knives on the housing during rotation to break the residue down into smaller pieces.

It is intended that the apparatus 106 be designed such as to effectively meter the residue being fed to the second reduction unit 107 and this can be accomplished by various means. One consideration is that the hub 112 can be rotated at various different speeds. At slower rates of rotation of the hub the peripheral spacing between the arms 111 effectively provides a wider gate or door for receiving material to be processed, while at higher speeds the amount of material grasped by the arms would be substantially less and thereby reduce the amount of residue being processed and fed into the second stage processing unit. The spacing of the arms 111 from one another peripherally around the shaft can be varied by any convenient means, for example, by mounting such arms on a hub attached to the shaft and which can be variously positioned thereby adjusting the gap between adjacent arms in the same plane. Also, longitudinally along the shaft the arms can be variously positioned, one relative to another, at different peripheral locations and/or aligned with one another depending upon the material and residue being processed.

Some experimentation will be required as to the type of residue being processed relative to the positioning of the knives or cutter arms 111 to accomplish the desired results.

The first residue reduction unit 106 is known in the art and further details of the same is believed unnecessary at this time.

Figure 5:
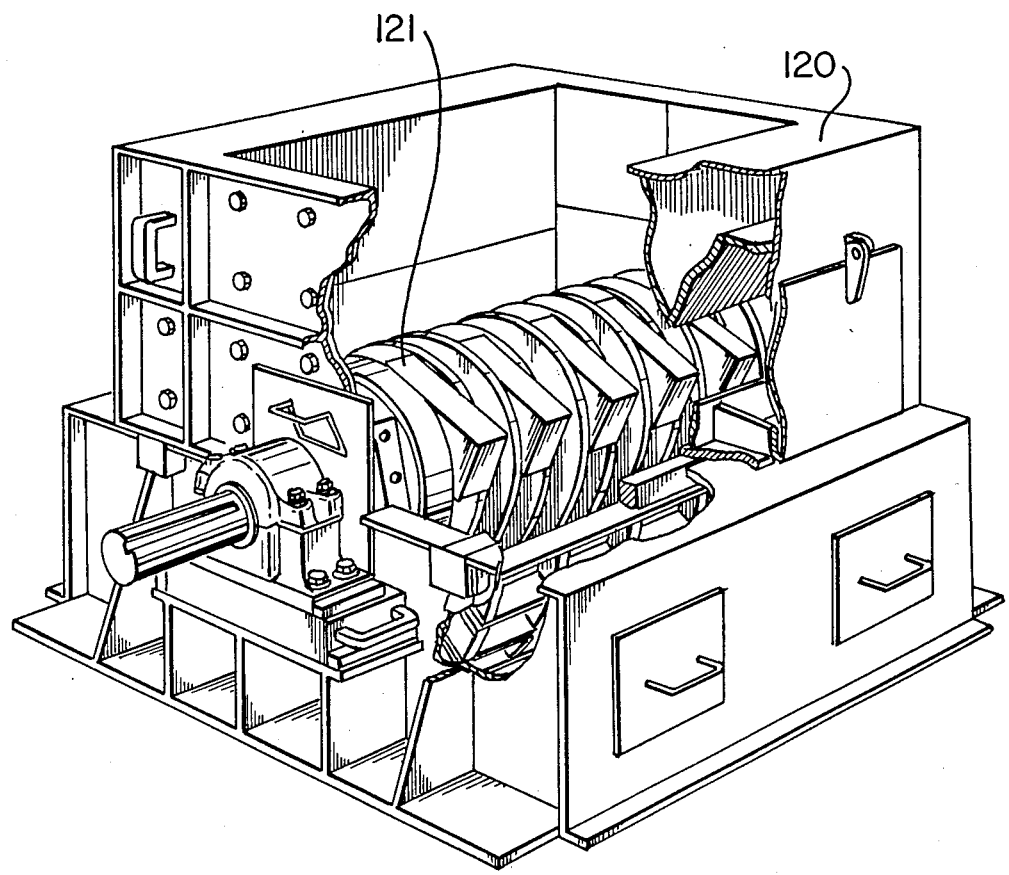
FIG. 5 is an oblique view of the second stage of the residue reduction apparatus.

The second residue reduction unit 107 is a conventional hammer mill illustrated in FIG. 5 and which is a Type AB hammer mill identified as a Jeffrey hammer mill by Dresser, or any other type. The hammer mill 107 has a housing 120 in which there is located a rotary cutter unit 121 driven by a hydraulic motor 122 through a gear reduction unit 123 (See FIG. 2). The rotor 121 is relatively massive and thus there is substantial inertial or momentum for receiving and levelling out energy requirements in handling a fluctuation in the flow from the first residue reduction unit 106. This inertia energy can be utilized effectively to control the flow of material from the first reduction unit 106 to the second reduction unit 107. For example, the inertia affect can be utilized in handling overloads by cutting off power requirements to motor 122 and diverting hydraulic fluid flow to the motors 113 of the first reduction unit so as to speed up the same and thereby cut down the amount of residue being processed by the same or at a greater speed cutting it up into finer material, thereby reducing the load on the second reduction unit 107.

The hammer mill 120 illustrated includes cutters mounted on a rotor and which cooperate, in a conventional manner, with fixed cutters in the housing unit. Alternatively, and as is well known in the art, the cutters can be pivotally mounted on the rotor shaft rather than positively fixed thereto.

Discharge from the second residue processor 107 is directly into a power driven fan unit 108 that blows the broken up residue through conduit 109 into the collector 200.

The first residue reduction unit 106, the second residue reduction unit 107 and the fan 108 are all driven by hydraulic motors and the circuitry thereof may be interrelated one relative to another so as to maximize the utilization of power and divide power requirements from one unit to the other to provide an efficient system for handling varying size and quantities of residue being processed.

It is primarily intended the first infeed reduction unit should be automatic self-feeding by rotation of arms 111. However, should infeed to such reduction unit be hampered by the type of material being fed thereto, additonal propelling means may be utilized, for example, a plurality of pivotally mounted arms on shaft which are rotatable parallel to the shaft on which arms 111 are mounted but spaced laterally therefrom so as to direct the debris to be processed into the processing area.

In the foregoing, there has been described means for automatic feed from the first processing or debris reduction unit to the second reduction unit, the latter of which may be referred to as a common hog unit. The motor driving the hog unit is preferably co-related to the drive of the first debris reduction unit so that the speed on the hog motor increases or decreases relative to the speed of the first reduction unit, depending upon the requirements to insure there is a constant feed from one to the other of the two units.

I claim:

1. Apparatus for processing residue such as branches, tree tops or the like resulting from tree harvesting operations comprising:
   (a) a first residue reduction unit having a hopper thereon for receiving the residue to be processed, said first reduction unit including a power driven horizontally disposed shaft having a plurality of arms mounted thereon, said arms having a leading edge curved in the direction of rotation and spaced apart from one another circumferentially around the longitudinally along the shaft, said curved arms cooperating with fixed knives to reduce the residue to smaller pieces:
   (b) a second residue reduction unit comprising a hammer mill also having a horizontally disposed power driven shaft; and
   (c) conveyor means comprising a power driven fan, mounted on a shaft that rotates about a vertical axis, for receiving the broken up residue from the second residue reduction unit and blowing the same to a residue collector, said first residue reduction unit, said second residue reduction unit and said power driven fan being mounted vertically one on top of the other with the fan at the bottom such that feed of material from one to the other is assisted by gravity;
   means for metering residue from the first residue reduction unit to the second residue reduction unit, said means comprising first and second hydraulic motors driving respectively said first and second residue reduction units; and
   means for diverting hydraulic fluid flow from one motor to the other interrelating power requirement of the motors for the respective reduction units in response to the demands thereon varying the speed of drive of the first and second residue reduction units relative to one another in such a manner as to avoid overloading of the second reduction unit by controlling the amount of residue being fed thereto by the first reduction unit.

2. Apparatus for reducing to chips residue left behind resulting from tree harvesting operations, such residue comprising branches, tree tops and the like, said apparatus comprising:
   a first residue reduction unit having a hopper thereon for receiving the residue to be processed, fixed cutter means mounted in said housing and cooperating with a plurality of arms radiating outwardly from a rotatable shaft to cut up the residue; said arms having a leading edge curved in the direction of rotation and spaced apart from one another circumferentially around and longitudinally along the shaft;
   a second residue reduction unit comprising a hammer mill disposed below the first residue reduction unit and fed directly therefrom;
   a fan blower type conveyor means located vertically below the second residue reduction unit for receiving the broken up residue therefrom and move the same to a residue collector, the axis of rotation of the fan being vertical and that of the first and second reduction units being horizontal and hydraulic motors driving respective ones of said first and second reduction units and including interconnected hydraulic circuitry for said motors such that all units operate to capacity without any overload on the other and the speed of said first and second reduction units is automatically varied relative to one another in response to power demands and thereby metering residue from the first reduction to the second to avoid clogging the latter.

* * * * *